US009098460B2

(12) United States Patent
Yanagisawa (10) Patent No.: US 9,098,460 B2
(45) Date of Patent: Aug. 4, 2015

(54) MATRIX CALCULATION METHOD, PROGRAM, AND SYSTEM

(75) Inventor: Hiroki Yanagisawa, Kanagawa-ken (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 241 days.

(21) Appl. No.: 13/591,631

(22) Filed: Aug. 22, 2012

(65) Prior Publication Data

US 2012/0317160 A1    Dec. 13, 2012

Related U.S. Application Data

(63) Continuation of application No. 13/363,421, filed on Feb. 1, 2012, now abandoned.

(30) Foreign Application Priority Data

Feb. 4, 2011  (JP) .................................. 2011-022311

(51) Int. Cl.
*G06F 17/16*    (2006.01)
(52) U.S. Cl.
CPC ...................................... *G06F 17/16* (2013.01)
(58) Field of Classification Search
USPC .......................................... 708/514, 520, 607
See application file for complete search history.

(56) References Cited

FOREIGN PATENT DOCUMENTS

WO    WO2009-107712 A    9/2009

OTHER PUBLICATIONS

R. Duan and S. Pettie. "Fast algorithms for (max, min)-matrix multiplication and bottleneck shortest paths," In Proceedings of the 20th Annual ACM-SIAM Symposium on Discrete Algorithms (SODA), pp. 384-391, 2009.*
Takaoka, T. "Efficient algorithms for the maximum subarray problem by distance matrix multiplication," Electronic Notes in Theoretical Computer Science, vol. 61, 2002.*
Zwick, U. "All-pairs shortest paths using bridging sets and rectangular matrix multiplication," Journal of the ACM, vol. 49, No. 3, pp. 289-317, 2002.*
A.V. Aho, et al., The Design and Analysis of Computer Algorithms. Addison-Wesley, 1974.
J.J. McAuley, et al., An expected-case sub-cubic Solution to the all-pairs Shortest Path Problem in R, arXiv:0912.0975v1, 2009.

* cited by examiner

*Primary Examiner* — Chuong D Ngo
*Assistant Examiner* — Matthew Sandifer
(74) *Attorney, Agent, or Firm* — Scully, Scott, Murphy & Presser, P.C.; Jeff Tang, Esq.

(57) ABSTRACT

A matrix calculation system for calculating funny matrix multiplication (FMM) of a matrix A and a matrix B, including: sequentially calculating a permutation of indices {ai} in which values are arranged in a non-decreasing order with respect to each i-th row where i=1 to the number of rows of the matrix A; storing a value, which is greater than expected as a value of a matrix, for C[i, j] with respect to each j-th column where j=1 to the number of columns of the matrix A in the i-th row; sequentially calculating a permutation of indices {bj} in which values are arranged in a non-decreasing order with respect to each j-th column where j=1 to the number of columns of the matrix B; and setting the values of C[i, j], which are i and j components of the matrix C.

12 Claims, 8 Drawing Sheets

MATRIX CALCULATION METHOD, PROGRAM, AND SYSTEM

CROSS-REFERENCE TO RELATED APPLICATION

This application is a continuation of and claims priority from U.S. patent application Ser. No. 13/363,421, filed Feb. 1, 2012, which in turn claims priority under 35 U.S.C. §119 from Japanese Patent Application No. 2011-022311 filed Feb. 4, 2011, the entire contents of both are incorporated herein by reference.

BACKGROUND OF THE INVENTION

1. Field of the Invention

The present invention relates to a technique for calculating matrices through computer processing, and more particularly to a funny matrix multiplication (FMM) calculation.

2. Description of Related Art

The term "FMM" means a matrix calculation process in which "add" (addition) and "multiply" (multiplication) in a normal matrix multiplication process are replaced by a min operation and an add operation. In other words, the definition of FMM is to calculate an equation, $C[i,j]=\min_k\{A[i,k]+B[k,j]\}$, with respect to all $(i, j)$ for two input matrices A and B. Although FMM is not limited to a square matrix, each of the matrices A and B is assumed to be a square matrix of n×n in this specification as a matter of convenience.

FMM is applicable to a shortest path calculation, image processing, or the like. For example, a document, "A. V. Aho, J. E. Hopcroft, and J. D. Ullman, 'The Design and Analysis of Computer Algorithms,' Addison-Wesley, 1974," describes an example of a technique for a shortest path calculation using FMM.

In FMM, the value from an addition "va[k]+vb[k]" is calculated in the order of k=1 to n with respect to two vectors va and vb each having a length n to find the minimum value as a basic calculation. Specifically, calculating an addition "$\min_k\{va[k]+vb[k]\}$" is the main processing and the processing is performed $n^2$ times, and therefore the entire FMM processing takes $O(n^3)$ time.

In recent years, demand for further speeding up the shortest path calculation is increasing in the fields of traffic simulation, car navigation, and the like. Therefore, an algorithm for speeding up FMM is described in the following document.

A document, "J. J. McAuley and T. S. Gaetano, 'An expected-case sub-cubic solution to the all-pairs shortest path problem in R,' arXiv: 0912.0975v1, 2009," discloses calculating permutations a1, a2, . . . , an and b1, b2, . . . , bn satisfying va[a1]≤va[a2]≤ . . . ≤va[an] and vb[b1]≤vb[b2]≤ . . . ≤vb[bn] before calculating $\min_k\{va[k]+vb[k]\}$ with respect to two vectors va and vb. In the entire FMM processing, the pre-calculation is achieved only by performing sort processing 2n times in total, and therefore the calculation takes only $O(n^2 \log n)$ time in total.

SUMMARY OF THE INVENTION

One aspect of the present invention provides a matrix calculation method for calculating funny matrix multiplication (FMM) of a matrix A and a matrix B, by processing of a computer, the method including the steps of: sequentially calculating a permutation of indices {ai} in which values are arranged in a non-decreasing order with respect to each i-th row where i=1 to the number of rows of the matrix A; storing a value, which is greater than expected as a value of a matrix, for C[i, j] with respect to each j-th column where j=1 to the number of columns of the matrix A in the i-th row, first, storing the values of C[i, j], which are i and j components of a matrix C which is a result of the FMM calculation, in a predetermined variable (best), sequentially calculating best=min{best, A[i, ak]+B[ak, j]} while incrementing k by one from 1, where ak is the k-th element of the permutation of indices {ai}, and updating C[i, j] according to C[i, j]=best in response to k exceeding the number of rows of the matrix A or A[i, ak] exceeds best/2; sequentially calculating a permutation of indices {bj} in which values are arranged in a non-decreasing order with respect to each j-th column where j=1 to the number of columns of the matrix B; and setting the values of C[i, j], which are i and j components of the matrix C, to best, with respect to each j-th column where j=1 to the number of columns of the matrix B in the j-th column, sequentially calculating best=min{best, A[i, bk]+B[bk, j]} while incrementing k by one from 1, where bk is the k-th element of the permutation of indices {bj}, and updating C[i, j] according to C[i, j]=best in response to k exceeding the number of columns of the matrix B or B[bk, j] exceeds best/2.

Another aspect of the present invention provides a computer readable article of manufacture tangibly embodying non-transitory computer readable instructions which, when executed, cause a computer to carry out the steps of a method for calculating funny matrix multiplication (FMM) of a matrix A and a matrix B, the method including the steps of: sequentially calculating a permutation of indices {ai} in which values are arranged in a non-decreasing order with respect to each i-th row where i=1 to the number of rows of the matrix A; storing a value, which is greater than expected as a value of a matrix, for C[i, j] with respect to each j-th column where j=1 to the number of columns of the matrix A in the i-th row, first, storing the values of C[i, j], which are i and j components of a matrix C which is a result of the FMM calculation, in a predetermined variable (best), sequentially calculating best=min{best, A[i, ak]+B[ak, j]} while incrementing k by one from 1, where ak is the k-th element of the permutation of indices {ai}, and updating C[i, j] according to C[i, j]=best in response to k exceeding the number of rows of the matrix A or A[i, ak] exceeds best/2; sequentially calculating a permutation of indices {bj} in which values are arranged in a non-decreasing order with respect to each j-th column where j=1 to the number of columns of the matrix B; and setting the values of C[i, j], which are i and j components of the matrix C, to best, with respect to each j-th column where j=1 to the number of columns of the matrix B in the j-th column, sequentially calculating best=min{best, A[i, bk]+B[bk, j]} while incrementing k by one from 1, where bk is the k-th element of the permutation of indices {bj}, and updating C[i, j] according to C[i, j]=best in response to k exceeding the number of columns of the matrix B or B[bk, j] exceeds best/2.

Another aspect of the present invention provides a matrix calculation system for calculating funny matrix multiplication (FMM) of a matrix A and a matrix B, by processing of a computer, the system including: means for sequentially calculating a permutation of indices {ai} in which values are arranged in a non-decreasing order with respect to each i-th row where i=1 to the number of rows of the matrix A; means for storing a value, which is greater than expected as a value of a matrix, for C[i, j] with respect to each j-th column where j=1 to the number of columns of the matrix A in the i-th row, first, storing the values of C[i, j], which are i and j components of a matrix C which is a result of the FMM calculation, in a predetermined variable (best), sequentially calculating best=min{best, A[i, ak]+B[ak, j]} while incrementing k by one from 1, where ak is the k-th element of the permutation of indices {ai}, and updating C[i, j] according to C[i, j]=best in response to k exceeding the number of rows of the matrix A or A[i, ak] exceeds best/2; means for sequentially calculating a permutation of indices {bj} in which values are arranged in a non-decreasing order with respect to each j-th column where j=1 to the number of columns of the matrix B; and means for setting the values of C[i, j], which are i and j components of the matrix C, to best, with respect to each j-th column where j=1 to the number of columns of the matrix B in the j-th column, sequentially calculating best=min{best, A[i, bk]+B[bk, j]} while incrementing k by one from 1, where bk is the k-th element of the permutation of indices {bj}, and updating C[i, j] according to C[i, j]=best in response to k exceeding the number of columns of the matrix B or B[bk, j] exceeds best/2.

BRIEF DESCRIPTION OF THE DRAWINGS

In order to describe features and benefits of the embodiment of the invention in detail, the following drawings will be referred to. Where possible, same or similar reference number will be used in drawings and description to denote same or similar part, in which.

DETAILED DESCRIPTION OF THE PREFERRED EMBODIMENTS

It is an object of the present invention to speed up the FMM calculation by further improving the technique disclosed in the aforementioned Non-patent Document 1.

Also in the present invention, the permutations a1, a2, ..., an and b1, b2, ..., bn are previously calculated so as to satisfy va[a1]≤va[a2]≤ ... ≤va[an] and vb[b1]≤vb[b2]≤ ... ≤vb[bn] before calculating $\min_k\{va[k]+vb[k]\}$.

The present invention is characterized by initializing best to ∞ and then applying each of the following process X and process Y once and outputting the value of best as the minimum value of va[k]+vb[k], instead of sequentially performing processing with respect to k=1 to n in the processing of calculating the minimum value of va[k]+vb[k], which is the main processing of FMM:

(Process X): The value of va[k]+vb[k] is calculated sequentially in the order of k=a1, a2, ... and then the processing is stopped when k satisfies va[k]>best/2 where the minimum value which has been found until then is best (unless such k appears, processing is stopped after performing the processing up to k=an); and (Process Y): The same processing as the process X is performed with respect to k=b1, b2, ... and then the processing is stopped when k satisfies vb[k]>best/2 (unless such k appears, processing is stopped after performing the processing up to k=bn).

The use of these processes enables the speed-up of the processing using an SIMD instruction in the FMM calculation. In this case, on the assumption of calculating the FMM of matrices A and B, the point is that the matrix A is stored in a column-major layout and the matrix B is stored in a row-major layout. It should be noted here that the term "column-major layout" means a method in which elements adjacent to each other in the column direction (in the matrix A) are arranged so as to be preferably adjacent to each other (also in a memory) when the matrix A is stored in the memory. More specifically, the elements of the matrix A are arranged in the order of A[1, 1], A[2, 1], A[3, 1], ..., A[n, 1], A[1, 2], A[2, 2], A[3, 2], ..., A[n, 2], A[1, 3], A[2, 3], ..., and A[n, n]. On the other hand, the term "row-major layout" is achieved by interchanging the columns and rows of the column-major layout. More specifically, the elements of the matrix A are arranged in the order of A[1, 1], A[1, 2], A[1, 3], ..., A[1, n], A[2, 1], A[2, 2], A[2, 3], ..., A[2, n], A[3, 1], A[3, 2], ..., and A[n, n].

According to the invention, the value of best is calculated once and then the calculation of the minimum value is stopped on the basis of the value to achieve a faster calculation of the minimum value, thereby enabling the speed-up of the FMM calculation process.

In addition, while it is difficult to use an SIMD instruction in the technique of Non-patent Document 1, the technique of the present invention is capable of using the SIMD instruction advantageously to further speed up the FMM calculation process.

Hereinafter, preferred embodiments of the present invention will be described in detail in accordance with the accompanying drawings. Unless otherwise specified, the same reference numerals denote the same elements throughout the drawings. It is to be understood that the following description is merely of one embodiment of the present invention and is not intended to limit the present invention to the contents described in the preferred embodiments.

Figure 1:
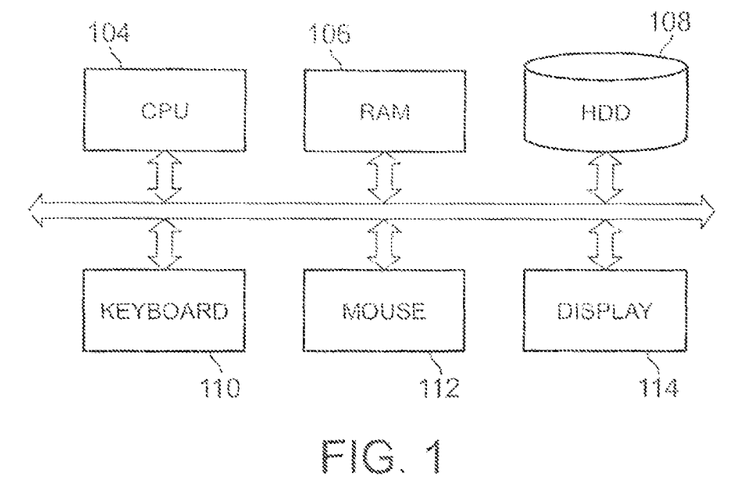
FIG. 1 is a block diagram of a hardware configuration for embodying the present invention.

Referring to FIG. 1, there is illustrated a block diagram of computer hardware for achieving the system configuration and performing processing according to one embodiment of the present invention. In FIG. 1, a system bus 102 is connected to a CPU 104, a main memory (RAM) 106, a hard disk drive (HDD) 108, a keyboard 110, a mouse 112, and a display 114. The CPU 104 is preferably based on a 32-bit or 62-bit architecture, and it is possible to use other CPUs such as, for example, Intel Pentium™ 4, Core™ 2 Duo, Xeon™, or AMD Athlon™. For the purpose of this embodiment, the CPU 104 has a single instruction multiple data (SIMD) instruction. The main memory 106 preferably has a capacity of 4 GB or more. It is desirable that the hard disk drive 108 has a capacity of, for example, 500 GB or more so as to be able to store a great deal of data which is to be a basis of matrix elements.

The hard disk drive 108 previously stores an operating system, though not individually illustrated. The operating system can be an arbitrary one compatible with the CPU 104, such as Linux™, Microsoft Windows XP™ or Windows™ 7, or Apple Computer Mac OS™.

The hard disk drive 108 also stores a programming language processor such as C, C++, C#, or Java®. This programming language processor is used to create and retain modules for a calculation process of funny matrix multiplication (FMM), which is described later, according to the present invention.

The hard disk drive 108 can further include a text editor for writing source codes to be compiled by the program language processor and a development environment such as Eclipse™.

The keyboard 110 and the mouse 112 are used to initiate the operating system or a program (not illustrated), which is loaded into the main memory 106 from the hard disk drive 108 and displayed on the display 114, and to type characters.

The display 114 is preferably a liquid crystal display, and one having an arbitrary resolution such as, for example, XGA (1024×768 resolution) or UXGA (1600×1200 resolution), can be used. The display 114 is used to display an operating window for starting the processing of the present invention or a result of the FMM calculation, though not illustrated.

Figure 2:
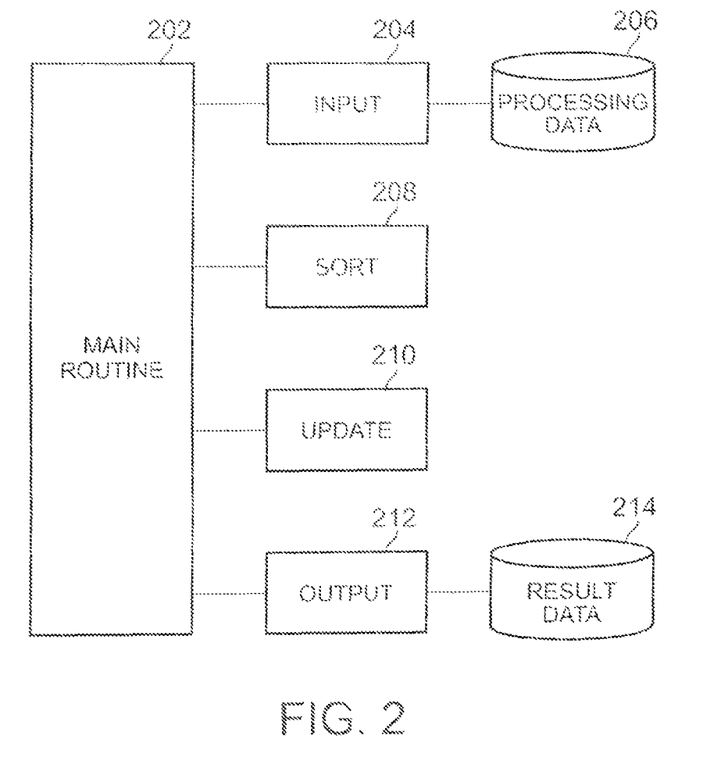
FIG. 2 is a functional logic block diagram according to the present invention.

Subsequently, referring to the functional block diagram of FIG. 2, processing routines for performing the processing of the present invention will be described. These processing routines are preferably created in a programming language capable of using an SIMD instruction, stored in the hard disk drive 108 in an executable format, and then loaded into the main memory 106 and executed by the action of the operating system.

A main routine 202 is a program for integrating the entire action of the present invention. Though not illustrated, the main routine 202 has functions of displaying an operating window on the display 114 and accepting a user's operation to start processing.

An input routine 204 has a function of reading data from a file of processing data 206 such as map data stored in the hard disk drive 108 to determine the respective elements of a matrix A and a matrix B.

A sort routine 208 has a function of performing a sort operation for finding permutations of indices for use in the FMM calculation according to the present invention. Although the sort algorithm in this instance is a quick sort algorithm, it is not limited thereto and any appropriate sort algorithm such as a shell sort, heap sort, or merge sort algorithm.

An update routine 210 has a function of performing processing of updating the elements of a matrix C as a result of FMM by using the permutations of the sorted indices. The details of the processing of the update routine 210 will be described later with reference to flowcharts in FIGS. 3 to 5 or flowcharts in FIGS. 7 to 9.

An output routine 212 has a function of writing out the matrix C, which has been obtained as a result of the FMM calculation of the matrices A and B, as a file of result data 214.

Figure 3:
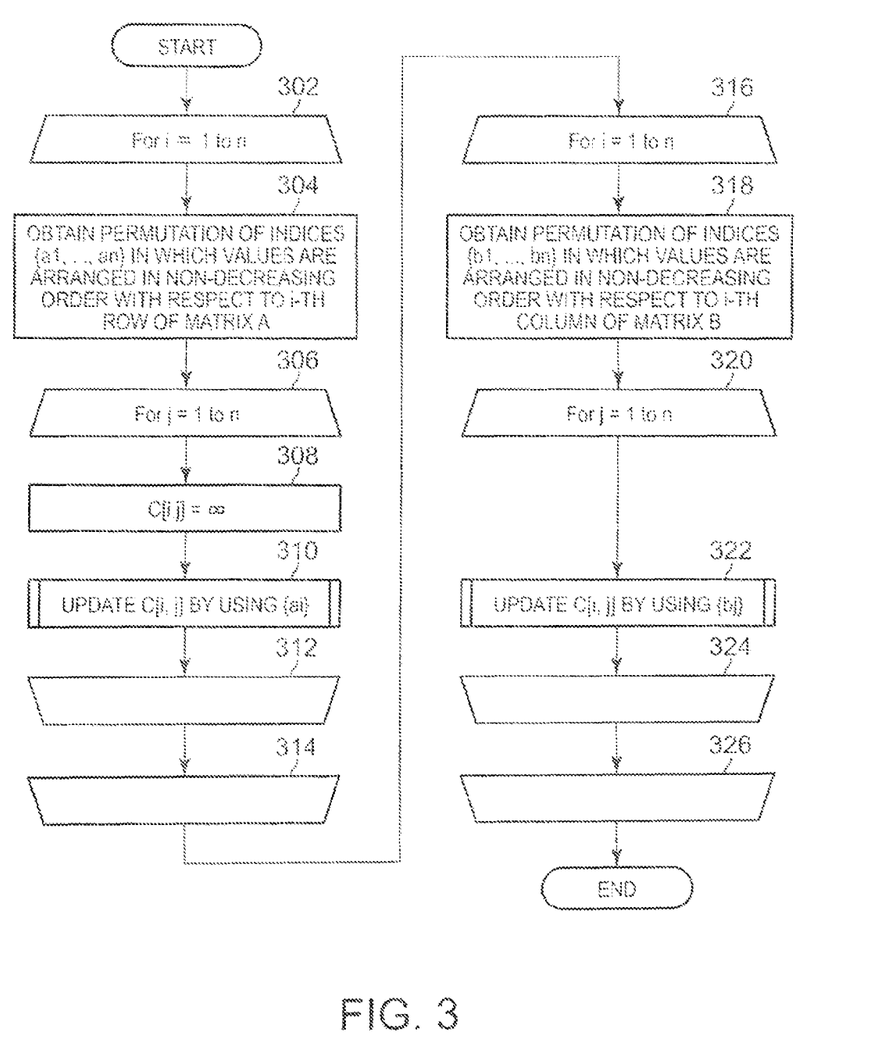
FIG. 3 is a diagram illustrating a flowchart representing the entire processing of one embodiment of the present invention.

The following describes the entire FMM calculation process according to the present invention with reference to the flowchart of FIG. 3. Before starting this process, the main routine 202 calls the input routine 204 and reads data from the file of the processing data 206 to determine the values of the respective elements of the matrices A and B. In this specification, it is assumed that each of the matrices A and B is a square matrix of n×n. It is, however, to be understood that the processing of the present invention is applicable to matrices other than square matrices.

In FIG. 3, steps 302 to 314 form a repetitive loop for i from 1 to n. In step 304, the main routine 202 calls the sort routine 208 to obtain a permutation of indices $\{a1, \ldots, an\}$ in which values are arranged in a non-decreasing order, with respect to the i-th row of the matrix A.

Steps 306 to 312 form a repetitive loop for j from 1 to n. In step 308, the main routine 202 stores the values as $C[i,j]=\infty$ with respect to the matrix C, which is a result of the FMM calculation of the matrices A and B. It should be noted here that $\infty$ means a value sufficiently large that does not appear in actual processing. The matrix C is also a square matrix of n×n in the same manner as the matrices A and B.

In step 310, the main routine 202 calls the update routine 210 to update $C[i,j]$ by using $\{ai\}$. It should be noted here that $\{ai\}$ means an abbreviation of $\{a1, \ldots, an\}$. The details of step 310 will be described later with reference to the flowchart of FIG. 4.

The main routine 202 increments j by one in step 312 and returns to step 306. Returning to step 306, the main routine 202 repeats step 308 and subsequent steps if j is n or less. If j exceeds n, the main routine 202 exits the loop of steps 306 to 312.

After exiting the loop in step 312, the main routine 202 increments i by one in step 314 and returns to step 302. Returning to step 302, the main routine 202 repeats step 304 and subsequent steps if i is n or less. If i exceeds n, the main routine 202 exits the loop of steps 302 to 314.

Steps 316 to 326 form a repetitive loop for i from 1 to n. In step 318, the main routine 202 calls the sort routine 208 to obtain a permutation of indices $\{b1, \ldots, bn\}$ in which values are arranged in a non-decreasing order, with respect to the i-th column of the matrix B.

Steps 320 to 324 form a repetitive loop for j from 1 to n. In step 322, the main routine 202 calls the update routine 210 to update $C[i,j]$ by using $\{bj\}$. Here, $\{bj\}$ is an abbreviation of $\{b1, \ldots, bn\}$. The details of step 322 will be described later with reference to the flowchart of FIG. 5.

The main routine 202 increments j by one in step 324 and returns to step 320. Returning to step 320, the main routine 202 repeats step 322 and subsequent steps if j is n or less. If j exceeds n, the main routine 202 exits the loop of steps 320 to 324.

After exiting the loop in step 324, the main routine 202 increments i by one in step 326 and returns to step 316. Returning to step 316, the main routine 202 repeats step 318 and subsequent steps if i is n or less. If i exceeds n, the main routine 202 exits the loop of steps 316 to 326.

After the end of the above processing, all elements of $C[i,j]$ have already been obtained. The main routine 202 calls the output routine 212 and writes the values of the elements of $C[i,j]$, as a file including the result data 214, to the hard disk drive 108.

Figure 4:
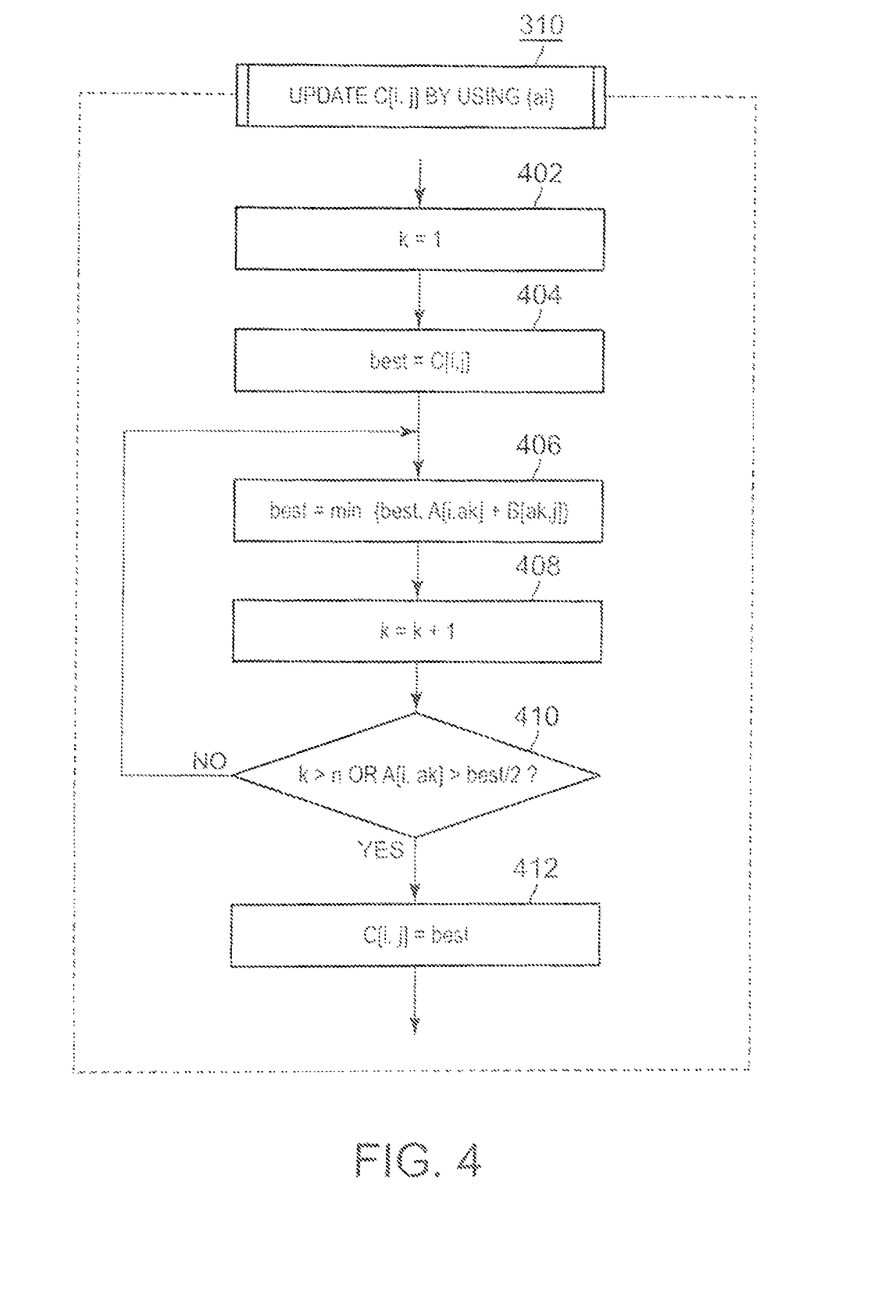
FIG. 4 is a diagram illustrating a flowchart representing the processing of updating the matrices in FIG. 3.

FIG. 4 is a flowchart illustrating step 310 of FIG. 3 in more detail. Although this processing is illustrated as processing of calling the update routine 210 as a subroutine in FIG. 3, a code corresponding to the flowchart of FIG. 4 can be embedded inline and executed.

In FIG. 4, the update routine 210 sets a variable k to 1 in step 402. The update routine 210 stores the values of $C[i,j]$ for a variable "best" in step 404.

In step 406, the update routine 210 updates the value of best according to an equation, "best=min{best, A[i, ak]+B[ak, j]}," and increments k by one in step 408.

In step 410, the update routine 210 determines whether or not k>n or A[i, ak]>best/2. If it is determined that neither of them is satisfied, the update routine 210 returns to step 406.

If determining that k>n or A[i, ak]>best/2 in step 410, the update routine 210 stores the values as $C[i,j]$=best in step 412 and step 310 ends.

Figure 5:
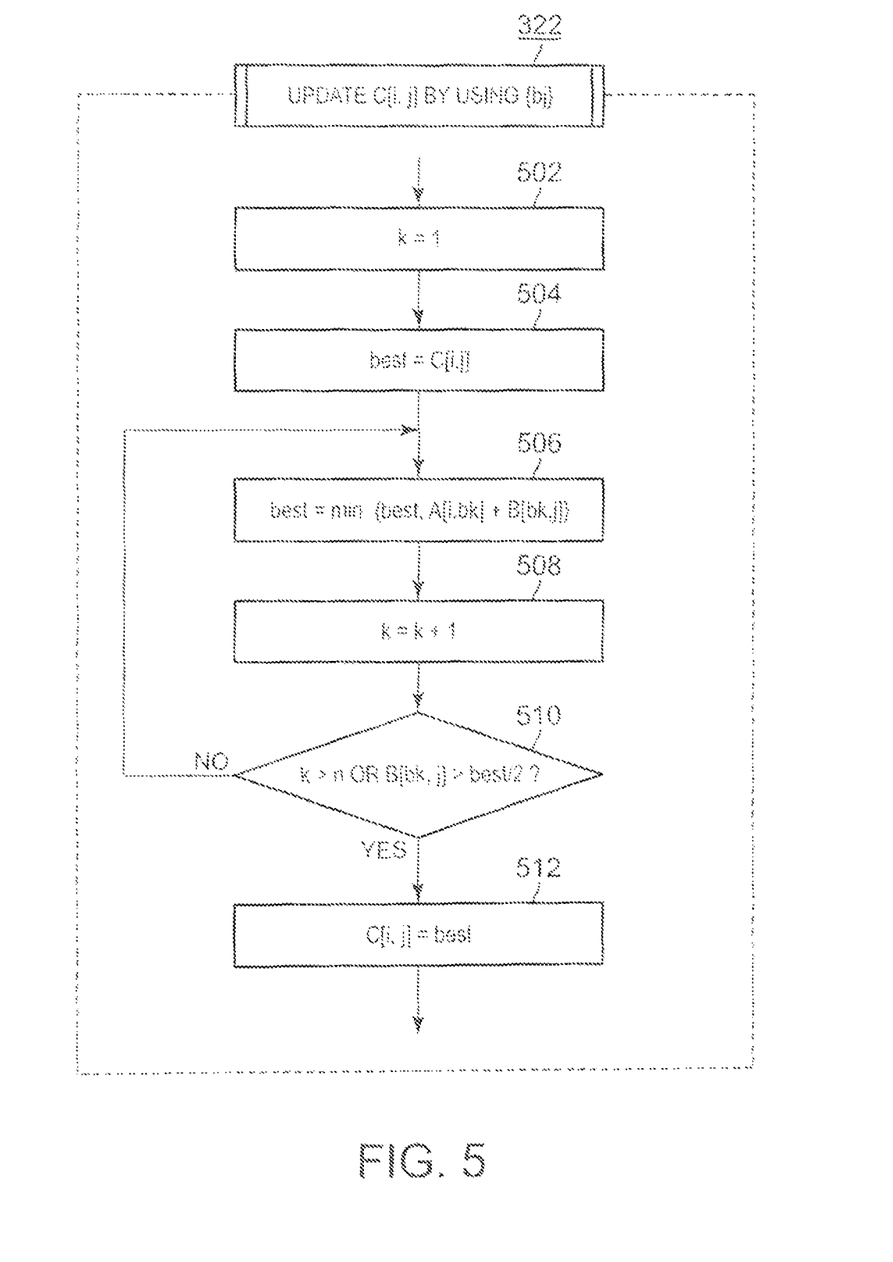
FIG. 5 is a diagram illustrating a flowchart representing the processing of updating the matrices in FIG. 3.

FIG. 5 is a flowchart illustrating step 322 of FIG. 3 in more detail. Although this processing is illustrated as processing of calling the update routine 210 as a subroutine in FIG. 3, a code corresponding to the flowchart of FIG. 4 can be embedded inline and executed.

In FIG. 5, the update routine 210 sets a variable k to 1 in step 502. The update routine 210 stores the values of $C[i,j]$ for a variable "best" in step 504.

In step 506, the update routine 210 updates the value of best according to an equation, "best=min{best, A[i, bk]+B[bk, j]}," and increments k by one in step 508.

In step 510, the update routine 210 determines whether or not k>n or B[bk, j]>best/2. If it is determined that neither of them is satisfied, the update routine 210 returns to step 506.

If determining that k>n or B[bk, j]>best/2 in step 510, the update routine 210 stores the values as C[i, j]=best in step 512 and then step 322 ends.

In this embodiment, the comparison can be stopped relatively early according to the determination of A[i, ak]>best/2 in step 410 of FIG. 4 or B[bk, j]>best/2 in step 510 of FIG. 5, and therefore the processing speed can be improved in comparison with the technique described in Non-patent Document 1.

A still further feature of the present invention is to provide improvement of processing speed by advantageously using an SIMD instruction. The technique will be described below with reference to FIG. 6.

Figure 6:
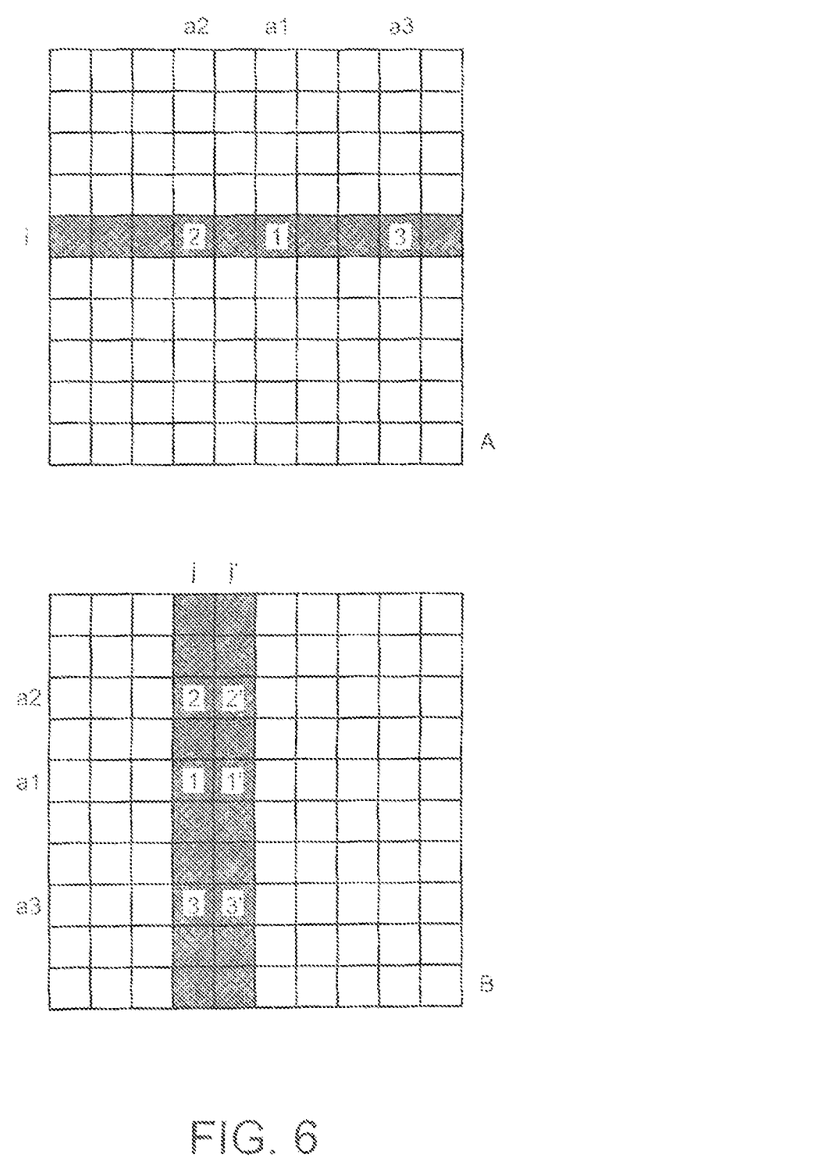
FIG. 6 is a diagram for describing processing supporting an SIMD instruction in the matrices.

Specifically, when C[i, j] and C[i, j'] (here, j'=j+1) are calculated according to the present invention:

For C[i, j], first, A[i, k]+B[k, j] is sequentially calculated in the order of k=a1, a2, . . . .

For C[i, j'], first, A[i, k]+B[k, j'] is sequentially calculated in the order of k=a1, a2, . . . .

In these two calculations, an access is made to values in the same row for the matrix A and an access is made to values adjacent to each other for the matrix B.

Therefore, the both calculations can be processed in a single loop by integrating and performing the calculations of C[i, j] and C[i, j'] at a time. In addition, if a 2-way SIMD instruction is used, A[i, k]+B[k, j] and A[i, k]+B[k, j'] can be processed by one vec_add instruction, thereby enabling the speed-up of the calculation.

While the end conditions of loops need to be adjusted when the loops are integrated, the adjustment can be easily performed.

Although the loop can elongate as a result of integrating loops in some cases, a decrease in the computing speed caused by the elongation is generally small in comparison with the speed-up by the SIMD instruction.

In the calculations of C[i, j] and C[i, j'], it is necessary to perform calculations with respect to k=b1, b2, . . . subsequently, but the calculations cannot be integrated. If it is assumed that i'=i+1, however, the calculations of C[i, j] and C[i', j] can be integrated in loop with respect to k=b1, b2, . . . . Therefore, the calculation is performed in two stages: for k=a1, a2, . . . , calculations of values adjacent to each other in the column direction in the matrix C are integrated; and for k=b1, b2, . . . , calculations of values adjacent to each other in the row direction in the matrix C are integrated. The technique in Non-patent Document 1 has a problem that the calculation cannot be resolved into a calculation for k=a1, a2, . . . and a calculation for k=b1, b2, . . . .

Although the SIMD implementation method is not limited to the above, for example, a header file such as emmintrin.h is included by using a processor such as gcc, or Visual C++ and data type declaration such as _m128i is used. For example, _mm_loadu_si128( ) is used for readout from the memory, _mm_set_epi32( ) is used for the initialization of a register, and _mm_add_epi32( ) is used for addition.

Subsequently, the entire processing of an embodiment preferred for the SIMD implementation will be described with reference to the flowchart of FIG. 7. Before starting this processing, the main routine 202 calls the input routine 204 and reads data from the file of the processing data 206 to determine the values of the respective elements of the matrices A and B. It is also assumed here that each of the matrices A and B is a square matrix of n×n. In addition, it is assumed that s is the multiplicity of SIMD units and that n is a number divisible by s.

Figure 7:
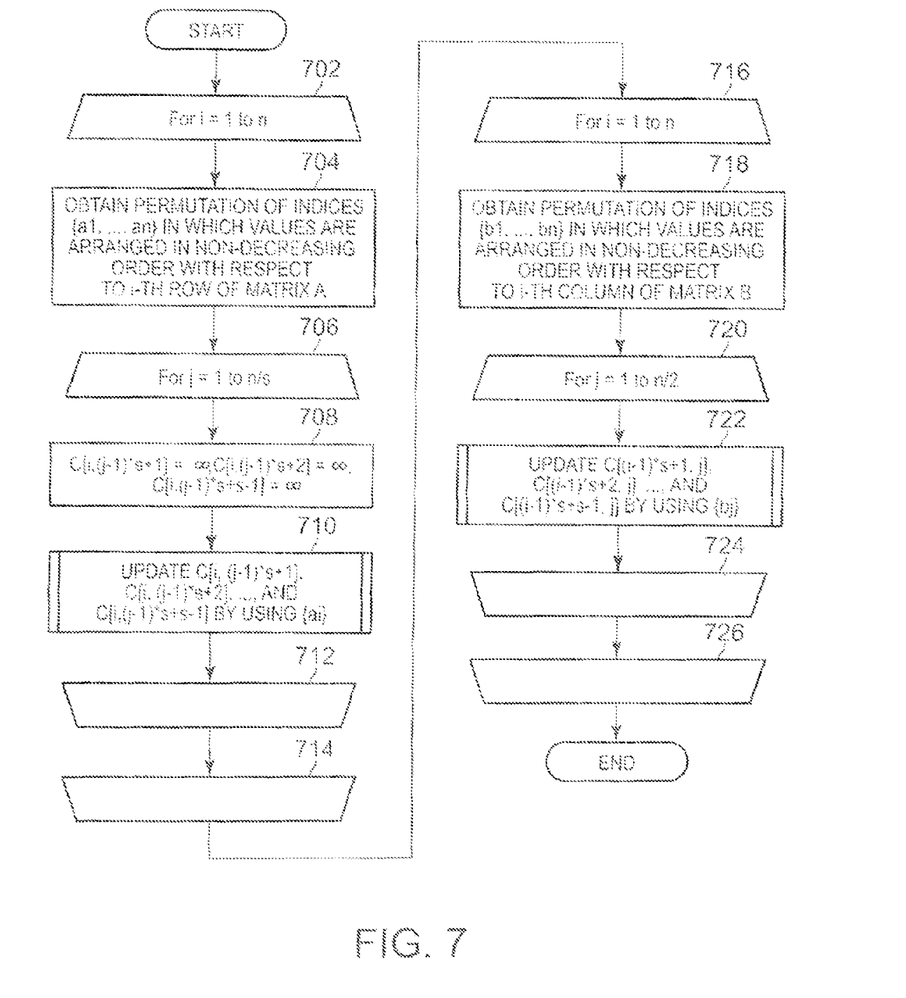
FIG. 7 is a diagram illustrating a flowchart representing the entire processing of an embodiment supporting an SIMD instruction of the present invention.

In FIG. 7, steps 702 to 714 form a repetitive loop for i from 1 to n. In step 704, the main routine 202 calls the sort routine 208 to obtain the permutation of indices {a1, . . . , an} in which values are arranged in a non-decreasing order, with respect to the i-th row of the matrix A.

Steps 706 to 712 form a repetitive loop for j from 1 to n/s. In step 708, the main routine 202 stores the values as C[i, (j−1)*s+1]=∞, C[i, (j−1)*s+2]=∞, . . . , and C[i, (j−1)*s+s−1]=∞ with respect to the matrix C, which is a result of the FMM calculation of the matrices A and B. It should be noted here that the matrix C is also a square matrix of n×n in the same manner as the matrices A and B.

In step 710, the main routine 202 calls the update routine 210 to update C[i, (j−1)*s+1], C[i, (j−1)*s+2], . . . , and C[i, (j−1)*s+s−1] by using {ai}. The details of step 710 will be described later with reference to the flowchart of FIG. 8.

The main routine 202 increments j by one in step 712 and then returns to step 706. Returning to step 706, the main routine 202 repeats step 708 and subsequent steps if j is n/s or less. If j exceeds n/s, the main routine 202 exits the loop of steps 706 to 712.

After exiting the loop in step 712, the main routine 202 increments i by one in step 714 and then returns to step 702. Returning to step 702, the main routine 202 repeats step 704 and subsequent steps if i is n or less. If i exceeds n, the main routine 202 exits the loop of steps 702 to 714.

Steps 716 to 726 form a repetitive loop for i from 1 to n. In step 718, the main routine 202 calls the sort routine 208 to obtain the permutation of indices {b1, . . . , bn} in which values are arranged in a non-decreasing order, with respect to the i-th column of the matrix B.

Steps 720 to 724 form a repetitive loop for j from 1 to n/s. In step 722, the main routine 202 calls the update routine 210 to update C[(i−1)*s+1, j], C[(i−1)*s+2, j], . . . , and C[(i−1)*s+s−1, j] by using {bi}. The details of step 722 will be described later with reference to the flowchart of FIG. 9.

The main routine 202 increments j by one in step 724 and then returns to step 720. Returning to step 720, the main routine 202 repeats step 722 and subsequent steps if j is n/s or less. If j exceeds n/s, the main routine 202 exits the loop of steps 720 to 724.

After exiting the loop in step 724, the main routine 202 increments i by one in step 726 and then returns to step 716. Returning to step 716, the main routine 202 repeats step 718 and subsequent steps if i is n or less. If i exceeds n, the main routine 202 exits the loop of steps 716 to 726.

At the end of the processing up to here, all elements of C[i, j] have already been obtained. The main routine 202 calls the output routine 212 and writes the values of the elements of C[i, j], as a file including the result data 214, into the hard disk drive 108.

Figure 8:
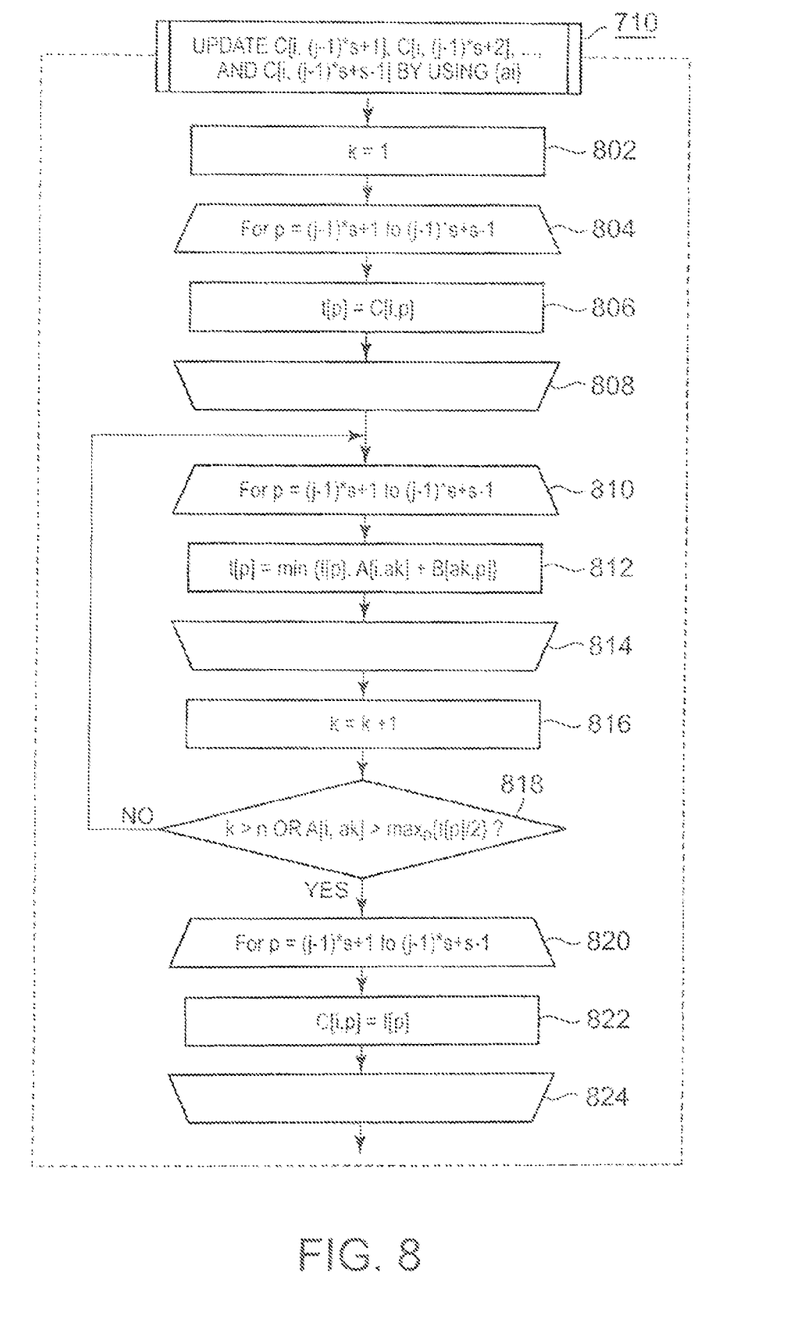
FIG. 8 is a diagram illustrating a flowchart representing the processing of updating the matrices in FIG. 7.

FIG. 8 is a flowchart illustrating step 710 of FIG. 7 in more detail. Although this processing is illustrated as processing of calling the update routine 210 as a subroutine in FIG. 7, a code corresponding to the flowchart of FIG. 8 can be embedded inline and executed.

The update routine 210 stores 1 for a variable k in step 802 in FIG. 8.

Steps 804 to 808 form a repetitive loop for p=(j−1)*s+1 to (j−1)*s+s−1. In step 806, the update routine 210 stores the values as t[p]=C[i, p]. After the completion of the loop for p=(j−1)*s+1 to (j−1)*s+s−1, the update routine 210 exits the loop and proceeds to step 810.

The subsequent steps 810 to 814 form a repetitive loop for p=(j−1)*s+1 to (j−1)s+s−1. In step 812, the update routine 210 performs update processing for t[p]=min{t[p], A[i, ak]+

B{ak, p]}. In this processing, the processing speed is improved by using a vec_add SIMD instruction for a plurality of A[i, ak]+B{ak, p] calculations in parallel. After the completion of this loop for p=(j−1)*s+1 to (j−1)*s+s−1, the update routine 210 exits the loop and proceeds to step 816.

The update routine 210 increments k by one in step 816 and determines whether or not k>n or A[i, ak]>max$_p${t[p]/2} in step 818. If the answer is negative, the processing returns to step 810.

If the answer of step 816 is affirmative, a loop of steps 820 to 824 is executed. Steps 820 to 824 form a repetitive loop for p=(j−1)*s+1 to (j−1)*s+s−1. The update routine 210 stores the values as C[i, p]=t[p] in step 822. After the completion of the loop for p=(j−1)*s+1 to (j−1)*s+s−1, step 710 ends.

Figure 9:
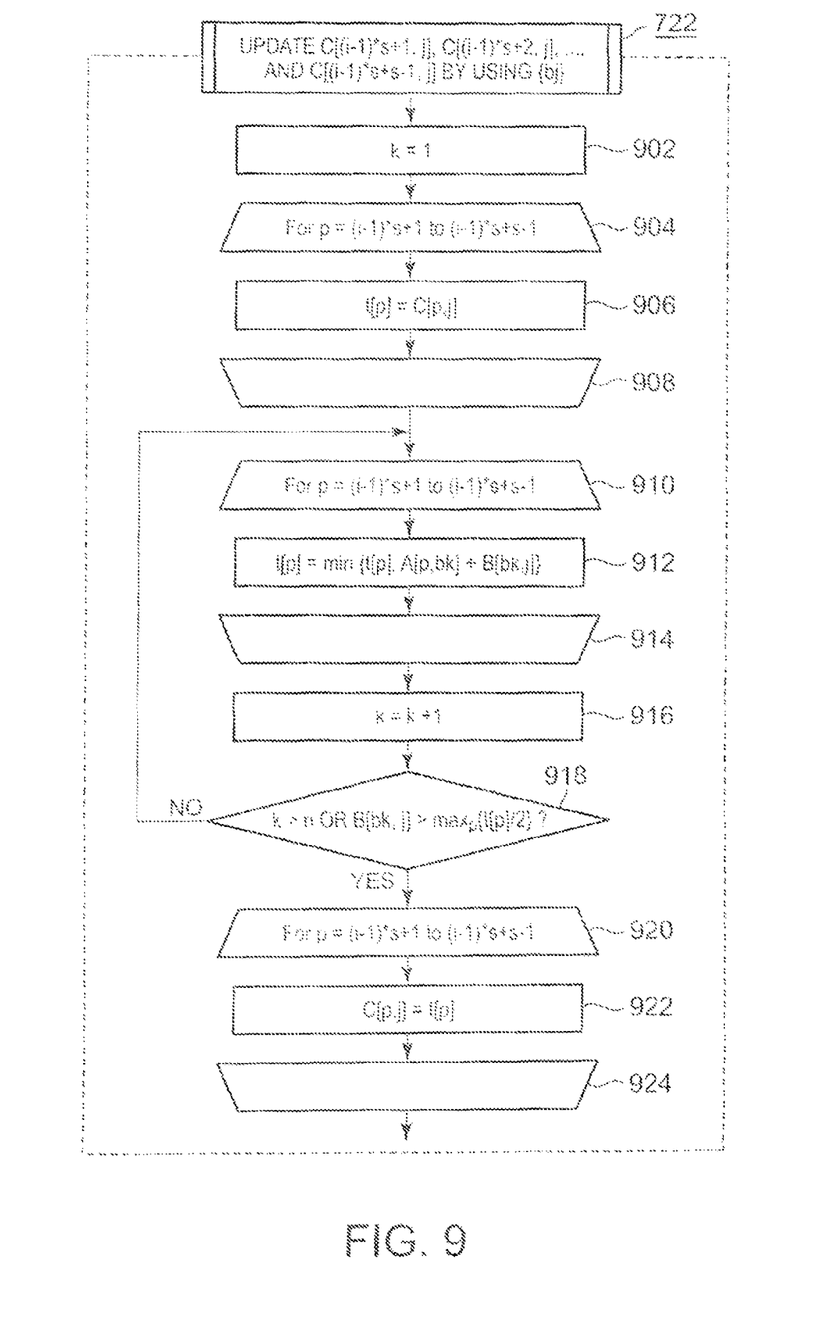
FIG. 9 is a diagram illustrating a flowchart representing the processing of updating the matrices in FIG. 7.

FIG. 9 is a flowchart illustrating step 722 of FIG. 7 in more detail. Although this processing is illustrated as processing of calling the update routine 210 as a subroutine in FIG. 7, a code corresponding to the flowchart of FIG. 9 can be embedded inline and executed.

The update routine 210 stores 1 for variable k in step 902 of FIG. 9.

Steps 904 to 908 form a repetitive loop for p=(i−1)*s+1 to (i−1)*s+s−1. In step 906, the update routine 210 stores the values as t[p]=C[p, j]. After the completion of the loop for p=(i−1)*s+1 to (i−1)*s+s−1, the update routine 210 exits the loop and proceeds to step 910.

The subsequent steps 910 to 914 form a repetitive loop for p=(i−1)*s+1 to (i−1)*s+s−1. In step 912, the update routine 210 performs update processing for t[p]=min{t[p], A[p, bk]+B{bk, j]}. In this processing, the processing speed is improved by using the vec_add SIMD instruction for a plurality of A[p, bk]+B{bk, j] calculations in parallel. After the completion of this loop for p=(i−1)*s+1 to (i−1)*s+s−1, the update routine 210 exits the loop and proceeds to step 916.

The update routine 210 increments k by one in step 916 and determines whether or not k>n or B[bk, j]>max$_p${t[p]/2} in step 918. If the answer is negative, the processing returns to step 910.

If the answer of step 916 is affirmative, a loop of steps 920 to 924 is executed. Steps 920 to 924 form a repetitive loop for p=(i−1)*s+1 to (i−1)*s+s−1. The update routine 210 stores the values as C[p, j]=t[p] in step 922. After the completion of the loop for p=(i−1)*s+1 to (i−1)*s+s−1, step 722 ends.

The processing of FIG. 4 or FIG. 5 written in a pseudo code is as follows:

```
best = ∞
i = 1
repeat
    best = min { best, va[ai] + vb[ai] }
    i = i+1
until (i > n or va[ai] > best/2)
j = 1
repeat
    best = min { best, va[bj] + vb[bj] }
    j = j+1
until (j > n or vb[bj] > best/2)
output best
```

For a decision condition (j>n or vb[bj]>best/2) in the above, the following embodiment is also conceivable:

```
best = ∞, temp = ∞
i = 1
repeat
    best = min {best, va[ai] + vb[ai]}
    temp = min {temp, vb[ai]}
    i = i + 1
until (i > n or va[ai] > best/2)
j = 1
repeat
    best = min {best, va[bj] + vb[bj]}
    j = j + 1
until (j > n or vb[bj] > min {best/2, temp})
output best
```

Since best/2≥min{best/2, temp}, the above makes the exit of the loop earlier. It should be noted here that the stop conditions of the two loops are different from each other.

Alternatively, the following example is possible:

```
best = ∞
i = 1
repeat
    best = min {best, va[ai] + vb[ai]}
    i = i + 1
until (i > n or va[ai] > best/2)
j = 1
repeat
    best = min {best, va[bj] + vb[bj]}
    j = j + 1
until (j > n − 1 or vb[bj] > best/2)
output best
```

In the above, the stop conditions of the two loops are different from each other, too.

Although it is assumed that each of the matrices A, B, and C is a square matrix of n×n in the above embodiment, the present invention is not limited thereto. Similarly to the normal multiplication of matrices, the matrix A and the matrix B can be made up of m×k and k×n, respectively. As a result, the matrix C is made up of m×n.

Although the present invention has been described hereinabove on the assumption that the invention is implemented in a specific hardware or software platform, the present invention is not limited to the illustrated examples, but can be implemented in any computer platform.

The invention claimed is:

1. A matrix calculation system for calculating funny matrix multiplication (FMM) of a matrix A and a matrix B the system comprising:
a memory;
a processor communicatively coupled to the memory, the processor configured to:
store in the memory the matrix A in a column-major layout and store in the memory the matrix B in a row-major layout;
sequentially calculate a permutation of indices {ai} in which values are arranged in a non-decreasing order with respect to each i-th row where i=1 to the number of rows of the matrix A;
store a value, which is greater than a value sufficiently large that does not appear in actual processing as a value of a matrix, for C[i, j] with respect to each j-th column where j=1 to the number of columns of the matrix A in the i-th row, first, storing the values of C[i, j], which are i and j components of a matrix C which is a result of the FMM calculation, in a predetermined variable defined as a variable best, sequentially calculating best=min{best, A[i, ak]+B[ak, j]} while incrementing k by one from 1, wherein ak is the k-th element of the permutation of indices {ai}, and determining if k exceeds the number of rows of the matrix A and determining if A[i, ak] exceeds best/2, and updating C[i, j] according to C[i, j]=best in response to either determination being true;
sequentially calculate a permutation of indices {bj} in which values are arranged in a non-decreasing order with respect to each j-th column where j=1 to the number of columns of the matrix B; and
set the values of C[i, j], which are i and j components of the matrix C, in best, with respect to each j-th column where j=1 to the number of columns of the matrix B in the j-th column, sequentially calculate best=min{best, A[i, bk]+B[bk, j]} while incrementing k by one from 1, wherein bk is the k-th element of the permutation of indices {bj}, and update C[i, j] according to C[i, j]=best in response to k exceeding the number of columns of the matrix B or B[bk, j] exceeds best/2, wherein the processor calculates a value of variable best once, and then stops the calculating of a respective min{best, A[i, ak]+B[ak, j]} value and min{best, A[i, bk]+B[bk, j]} value on the basis of the best value to result in a faster calculation of the respective minimum value, thereby enabling increasing the speed of an FMM calculation process by the processor.

2. The system according to claim 1, wherein said processor is further configured to:
update C[i, j] according to C[i, j]=best in response to A[i, ak]>best/2 and update C[i, j] according to C[i, j]=best in response to B[bk, j]>best/2 by executing divided portions with loops integrated in parallel by using an SIMD instruction.

3. The system according to claim 2, wherein to process a single instruction multiple data (SIMD) instruction the processor is further configured to:
calculate a C[i, j] and C[i, j'], wherein j'=j+1, wherein for said C[i, j], an A[i, k]+B[k, j] are first sequentially calculated in the order of k=a1, a2, ... an, and for said C[i, j'], A[i, k]+B[k, j'] are first sequentially calculated in the order of k=a1, a2, ... an,
wherein for these two calculations, said processor accessing values in the same row for the matrix A and accessing values adjacent to each other for the matrix B, thereby processing both said calculations in a single loop by integrating and performing the calculations of C[i, j] and C[i, j'] at a time.

4. The system according to claim 1, wherein each of the matrices A, B, and C is a square matrix of n×n.

5. An information processing system for calculating funny matrix multiplication (FMM) of a matrix A and a matrix B, the information processing system comprising:
a memory;
a processor communicatively coupled to the memory; and
a module communicatively coupled to the memory and the processor, wherein the module is configured to perform a method comprising the steps of:
storing, in the memory the matrix A in a column-major layout and storing in the memory the matrix B in a row-major layout;
sequentially calculating a permutation of indices {ai} in which values are arranged in a non-decreasing order with respect to each i-th row where i=1 to the number of rows of the matrix A;
storing a value, which is greater than a value sufficiently large that does not appear in actual processing as a value of a matrix, for C[i, j] with respect to each j-th column where j=1 to the number of columns of the matrix A in the i-th row, first, storing the values of C[i, j], which are i and j components of a matrix C which is a result of the FMM calculation, in a predetermined variable defined as a variable best, sequentially calculating best=min{best, A[i, ak]+B[ak, j]} while incrementing k by one from 1, wherein ak is the k-th element of the permutation of indices {ai}, and determining if k exceeds the number of rows of the matrix A and determining if A[i, ak] exceeds best/2, and updating C[i, j] according to C[i, j]=best in response to either determination being true;
sequentially calculating a permutation of indices {bj} in which values are arranged in a non-decreasing order with respect to each j-th column where j=1 to the number of columns of the matrix B;
setting the values of C[i, j], which are i and j components of the matrix C, in best, with respect to each j-th column where j=1 to the number of columns of the matrix B in the j-th column, sequentially calculating best=min{best, A[i, bk]+B[bk, j]} while incrementing k by one from 1, wherein bk is the k-th element of the permutation of indices {bj}, and determining if k exceeds the number of rows of the matrix B and updating C[i, j] according to C[i, j]=best in response to k exceeding the number of columns of the matrix B or B[bk, j] exceeds best/2,
wherein a value of the variable best is calculated once, and then
the calculating of a respective min{best, A[i, ak]+B[ak, j]} and min{best, A[i, bk]+B[bk, j]} value on the basis of the best value results in a faster calculation of the respective minimum value, thereby increasing the speed of an FMM calculation process by the processor.

6. The information processing system according to claim 5, wherein the updating C[i, j] according to C[i, j]=best in response to A[i, ak]>best/2 and the updating C[i, j] according to C[i, j]=best in response to B[bk, j]>best/2, comprises executing divided portions with loops integrated in parallel by using an SIMD instruction.

7. The information processing system according to claim 6, wherein to process a single instruction multiple data (SIMD) instruction, the method further comprises:
calculating a C[i, j] and C[i, j'], wherein j'=j+1, wherein for said C[i, j], an A[i, k]+B[k, j] are first sequentially calculated in the order of k=a1, a2, ... an, and for said C[i, j'], A[i, k]+B[k, j'] are first sequentially calculated in the order of k=a1, a2, ... an,
wherein for these two calculations, said processor accesses values in the same row for the matrix A and accesses values adjacent to each other for the matrix B, thereby processing both said calculations in a single loop by integrating and performing the calculations of C[i, j] and C[i, j'] at a time.

8. The information processing system according to claim 5, wherein each of the matrices A, B, and C is a square matrix of n×n.

9. A computer program product for calculating funny matrix multiplication (FMM) of a matrix A and a matrix B, the computer program product comprising a non-transitory computer readable storage medium having program instructions embodied therewith, the program instructions executable by a processor to cause a processor to cause the processor to carry out the method comprising the steps of:
storing, in a memory, the matrix A in a column-major layout and storing in the memory the matrix B in a row-major layout;
sequentially calculating a permutation of indices {ai} in which values are arranged in a non-decreasing order with respect to each i-th row where i=1 to the number of rows of the matrix A;
storing a value, which is greater than a value sufficiently large that does not appear in actual processing as a value of a matrix, for C[i, j] with respect to each j-th column where j =1 to the number of columns of the matrix A in the i-th row, first, storing the values of C[i, j], which are i and j components of a matrix C which is a result of the FMM calculation, in a predetermined variable defined as a variable best, sequentially calculating best=min{best, A[i, ak]+B[ak, j]} while incrementing k by one from 1, wherein ak is the k-th element of the permutation of indices {ai}, and determining if k exceeds the number of rows of the matrix A and determining if A[i, ak] exceeds best/2, and updating C[i, j] according to C[i, j]=best in response to either determination being true;

sequentially calculating a permutation of indices {bj} in which values are arranged in a non-decreasing order with respect to each j-th column where j=1 to the number of columns of the matrix B;

setting the values of C[i, j], which are i and j components of the matrix C, in best, with respect to each j-th column where j=1 to the number of columns of the matrix B in the j-th column, sequentially calculating best=min{best, A[i, bk]+B[bk, j]} while incrementing k by one from 1, wherein bk is the k-th element of the permutation of indices {bj}, and determining if k exceeds the number of rows of the matrix B and updating C[i, j] according to C[i, j]=best in response to k exceeding the number of columns of the matrix B or B[bk, j] exceeds best/2, wherein a value of the variable best is calculated once, and then the calculating of a respective min{best, A[i, ak]+B[ak, j]} and min{best, A[i, bk]+B[bk, j]} value on the basis of the best value results in a faster calculation of the respective minimum value, thereby increasing the speed of an FMM calculation process by the processor.

10. The computer program product according to claim 9, wherein:

the matrix A is stored in a column-major layout and the matrix B is stored in a row-major layout; and in the step of updating C[i, j] according to C[i, j]=best in response to A[i, ak]>best/2 and the step of updating C[i, j] according to C[i, j]=best in response to B[bk, j]>best/2, divided portions with loops integrated are executed in parallel by using an SIMD instruction.

11. The computer program product according to claim 10, further comprising: processing of a single instruction multiple data (SIMD) instruction, the method further comprising:

calculating a C[i, j] and C[i, j'], wherein j'=j+1, wherein for said C[i, j], an A[i, k]+B[k, j] are first sequentially calculated in the order of k=a1, a2, . . . an, and for said C[i, j'], A[i, k]+B[k, j'] are first sequentially calculated in the order of k=a1, a2, . . . an, wherein for these two calculations, said processor accesses values in the same row for the matrix A and accesses values adjacent to each other for the matrix B, thereby processing both said calculations in a single loop by integrating and performing the calculations of C[i, j] and C[i, j'] at a time.

12. The computer program product according to claim 9, wherein each of the matrices A, B, and C is a square matrix of n×n.

* * * * *